United States Patent
Obembe et al.

(10) Patent No.: US 11,750,692 B2
(45) Date of Patent: *Sep. 5, 2023

(54) CONNECTION POOL ANOMALY DETECTION MECHANISM

(71) Applicant: Salesforce, Inc., San Francisco, CA (US)

(72) Inventors: Olumayokun Obembe, Concord, CA (US); Da Zhao, San Mateo, CA (US); Fabio Meireles Fernandez Valbuena, Alpharetta, GA (US); Ping-Hsiu Hsieh, San Francisco, CA (US); Xiaodan Wang, Dublin, CA (US); Vijayanth Devadhar, Fremont, CA (US); Jason Woods, Toronto (CA); Ashwini Bijwe, Hayward, CA (US); Yichuan Cai, Bellevue, WA (US); Paul E. Jatkowski, Clinton Township, MI (US); Kin Lun Wong, Hillsborough, CA (US); Sidarth Conjeevaram, San Jose, CA (US); Zeyu Zheng, Hayward, CA (US); Jae Young Park, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/475,825

(22) Filed: Sep. 15, 2021

(65) Prior Publication Data

US 2022/0006858 A1  Jan. 6, 2022

Related U.S. Application Data

(63) Continuation of application No. 16/660,904, filed on Oct. 23, 2019, now Pat. No. 11,165,857.

(51) Int. Cl.
*H04L 67/101* (2022.01)
*G06F 11/30* (2006.01)
*G06F 16/25* (2019.01)

(52) U.S. Cl.
CPC ........ *H04L 67/101* (2013.01); *G06F 11/3006* (2013.01); *G06F 16/252* (2019.01)

(58) Field of Classification Search
CPC ..... H04L 67/12; H04L 41/0893; H04L 67/10; H04L 29/06; H04L 41/12; H04L 67/02;
(Continued)

(56) References Cited

U.S. PATENT DOCUMENTS

| 4,239,983 A | 12/1980 | Edwards |
| 4,334,320 A | 6/1982 | Liman |

(Continued)

FOREIGN PATENT DOCUMENTS

| CA | 2973825 C | 3/2018 |
| CN | 1623139 A | 6/2005 |

(Continued)

OTHER PUBLICATIONS

Office Action for U.S. Appl. No. 16/570,729, 19 pages, dated Aug. 20, 2020.

(Continued)

*Primary Examiner* — Djenane M Bayard
(74) *Attorney, Agent, or Firm* — Kwan & Olynick LLP

(57) ABSTRACT

Techniques and structures to prevent exhaustion of a database connection pool, including retrieving data from the database connection pool, monitoring the data to determine whether the connection pool is at risk of an exhaustion condition, analyzing the data to determine whether one or more clients accessing the database connection pool are offenders upon determining that the connection pool is at risk and throttling access to the one or more clients accessing (Continued)

the database connection pool upon determining the one or more clients to be offenders.

16 Claims, 7 Drawing Sheets

(58) Field of Classification Search
CPC . H04L 67/1002; H04L 67/1097; H04L 67/16; H04L 12/185; H04L 63/08; H04L 12/66; H04L 45/00; H04L 67/14; H04L 41/0806; H04L 45/02; H04L 69/329; H04L 67/306; H04L 51/04; H04L 65/1069; H04L 67/42; H04L 63/0428; H04L 67/141; H04L 12/4641; H04L 67/104; H04L 45/245; H04L 65/403; H04L 43/0811; H04L 47/125; H04L 67/1095; H04L 67/101; H04L 67/1001; H04L 67/1008; H04L 67/1027; H04L 67/1034; H04L 67/142; H04L 12/28; H04L 41/5009; H04L 41/5096; H04L 43/0864; H04L 41/147; H04L 41/149; H04L 43/04; H04L 43/08; H04L 43/10; H04L 43/14; H04L 43/16; H04L 65/40; H04L 41/00; H04L 41/026; H04L 67/01; H04L 63/0815; H04L 67/1004; H04L 63/0823; H04L 63/10; H04L 43/0876; H04L 63/0807; H04L 67/145; H04L 43/0817; H04L 63/105; H04L 67/34; H04L 63/108; H04L 69/16; H04L 63/102; H04L 67/56; H04L 67/568; H04L 67/60; H04L 69/22; H04L 41/22; H04L 63/0281; H04L 63/083; H04L 41/0894; H04L 63/0263; H04L 63/0457; H04L 63/0218; H04L 63/04; H04L 63/061; H04L 69/28; H04L 69/32; H04L 69/324; H04L 12/1403; H04L 63/0236; H04L 63/0272; H04L 67/1029; H04L 12/14; G06F 11/3006; G06F 16/252; G06F 11/0751; G06F 11/0793; G06F 11/3433; G06F 2201/875; G06F 11/3495; G06F 11/3419; G06F 11/3452; G06F 11/3442; G06F 11/2097; G06F 11/323; G06F 11/3447; G06F 11/079; G06F 2201/865; G06F 11/0706; G06F 11/0757
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,697,849 B1 | 2/2004 | Carlson | |
| 6,711,565 B1 | 3/2004 | Subramaniam et al. | |
| 6,717,912 B1 | 4/2004 | Lemyre | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,862,623 B1 | 3/2005 | Odhner | |
| 7,289,976 B2 | 10/2007 | Kihneman et al. | |
| 7,299,976 B2 | 11/2007 | Nakada | |
| 7,340,411 B2 | 3/2008 | Cook | |
| 7,388,839 B2 | 6/2008 | Chafle | |
| 7,620,655 B2 | 11/2009 | Larsson et al. | |
| 7,925,756 B1 | 4/2011 | Riddle | |
| 8,244,865 B2 | 8/2012 | Burke | |
| 8,862,837 B1 | 10/2014 | Marshak | |
| 9,785,687 B2 | 10/2017 | Shivarudraiah | |
| 9,942,312 B1 | 4/2018 | Langseth | |
| 10,051,046 B1 | 8/2018 | Zacharski | |
| 10,191,922 B2 | 1/2019 | Michael | |
| 10,505,857 B1 | 12/2019 | Bandlamudi | |
| 10,657,064 B1 | 5/2020 | Khan | |
| 10,659,371 B1 | 5/2020 | Jain | |
| 10,931,530 B1 | 2/2021 | Rzehak | |
| 11,151,150 B2 | 10/2021 | Obembe | |
| 2001/0044791 A1 | 11/2001 | Richter et al. | |
| 2002/0000355 A1 | 1/2002 | Hattori | |
| 2002/0022986 A1 | 2/2002 | Coker et al. | |
| 2002/0003557 A1 | 3/2002 | Brodersen et al. | |
| 2002/0029161 A1 | 3/2002 | Brodersen et al. | |
| 2002/0029376 A1 | 3/2002 | Ambrose et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |

(56) References Cited

U.S. PATENT DOCUMENTS

| | | |
|---|---|---|
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0088413 A1* | 5/2004 | Bhogi .................. G06F 9/5061 709/226 |
| 2004/0128001 A1 | 7/2004 | Levin et al. |
| 2004/0139433 A1 | 7/2004 | Blythe |
| 2004/0153545 A1 | 8/2004 | Pandya |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0215733 A1 | 10/2004 | Gondhalekar |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0015644 A1 | 1/2005 | Chu et al. |
| 2005/0050555 A1 | 3/2005 | Exley et al. |
| 2005/0074236 A1 | 4/2005 | Urimindi |
| 2005/0088976 A1 | 4/2005 | Chafle |
| 2005/0091098 A1 | 4/2005 | Brodersen et al. |
| 2005/0144267 A1 | 6/2005 | Maron |
| 2005/0144505 A1 | 6/2005 | Takeuchi |
| 2005/0262183 A1 | 11/2005 | Colrain |
| 2006/0029037 A1 | 2/2006 | Chen |
| 2006/0074970 A1 | 4/2006 | Narayanan |
| 2006/0095572 A1 | 5/2006 | Burke |
| 2006/0120411 A1 | 6/2006 | Basu |
| 2007/0076585 A1 | 4/2007 | Kim |
| 2007/0076586 A1 | 4/2007 | Kim |
| 2007/0118630 A1 | 5/2007 | Hashimoto |
| 2007/0223388 A1 | 9/2007 | Arad |
| 2007/0268910 A1 | 11/2007 | Shen |
| 2007/0280111 A1 | 12/2007 | Lund |
| 2008/0016233 A1 | 1/2008 | Schneider |
| 2008/0175226 A1 | 7/2008 | Alperovitch |
| 2009/0177744 A1 | 7/2009 | Marlow et al. |
| 2009/0210360 A1 | 8/2009 | Sankar |
| 2010/0061476 A1 | 3/2010 | Kim |
| 2010/0100307 A1 | 4/2010 | Kim |
| 2010/0217872 A1 | 8/2010 | Martchenko |
| 2010/0322089 A1 | 12/2010 | Raja |
| 2010/0322237 A1 | 12/2010 | Raja |
| 2011/0007641 A1 | 1/2011 | Galotto |
| 2011/0153581 A1 | 6/2011 | Kass |
| 2011/0182191 A1 | 7/2011 | Jackson |
| 2011/0276982 A1 | 11/2011 | Nakayama |
| 2012/0030083 A1* | 2/2012 | Newman ................ G06Q 40/00 705/35 |
| 2012/0226804 A1 | 9/2012 | Raja |
| 2013/0054516 A1 | 2/2013 | Somogyi |
| 2013/0114130 A1 | 5/2013 | Stampoulidis |
| 2013/0310959 A1 | 11/2013 | Sandu |
| 2013/0326067 A1 | 12/2013 | Smith, II |
| 2014/0025772 A1 | 1/2014 | Szeto |
| 2014/0089928 A1 | 3/2014 | Stern |
| 2014/0161451 A1 | 6/2014 | Graves |
| 2014/0304352 A1 | 10/2014 | Chaudhary |
| 2014/0379756 A1 | 12/2014 | Shivarudraiah |
| 2014/0379910 A1 | 12/2014 | Saxena |
| 2015/0006726 A1 | 1/2015 | Yuan |
| 2015/0026213 A1 | 1/2015 | Hegde |
| 2015/0043905 A1 | 2/2015 | Graves |
| 2015/0149635 A1 | 5/2015 | Rajagopalan |
| 2015/0230199 A1 | 8/2015 | Jeong |
| 2015/0281017 A1 | 10/2015 | Sarkar |
| 2015/0304204 A1 | 10/2015 | Robitaille |
| 2015/0326441 A1 | 11/2015 | Smith |
| 2016/0065486 A1 | 3/2016 | Hariharan |
| 2016/0170978 A1 | 6/2016 | Michael |
| 2016/0219602 A1 | 7/2016 | Takeuchi |
| 2016/0274962 A1 | 9/2016 | Fortune |
| 2016/0300142 A1 | 10/2016 | Feller |
| 2016/0315862 A1 | 10/2016 | Shum |
| 2017/0078090 A1 | 3/2017 | Garay |
| 2017/0115333 A1 | 4/2017 | Radic |
| 2017/0201458 A1 | 7/2017 | Rivera |
| 2017/0223112 A1 | 8/2017 | Kouno |
| 2017/0230306 A1 | 8/2017 | Cropper |
| 2017/0264671 A1 | 9/2017 | Homma |
| 2017/0311183 A1 | 10/2017 | Cotanis |
| 2018/0019322 A1 | 1/2018 | Takashima |
| 2018/0019922 A1* | 1/2018 | Robison .............. H04L 43/0876 |
| 2018/0027060 A1 | 1/2018 | Metsch |
| 2018/0039678 A1 | 2/2018 | De Lavarene |
| 2018/0046730 A1 | 2/2018 | De Lavarene |
| 2018/0060377 A1 | 3/2018 | Kulkarni |
| 2018/0089324 A1 | 3/2018 | Pal |
| 2018/0150337 A1 | 5/2018 | Dolgov |
| 2018/0165469 A1 | 6/2018 | Ks |
| 2018/0173567 A1 | 6/2018 | Olshefski |
| 2019/0005047 A1 | 1/2019 | D'Amore |
| 2019/0075183 A1 | 3/2019 | Silberkasten |
| 2019/0227684 A1 | 7/2019 | Erez |
| 2019/0289067 A1 | 9/2019 | Chiba |
| 2019/0342028 A1 | 11/2019 | He |
| 2019/0342398 A1 | 11/2019 | Kasten et al. |
| 2020/0004877 A1 | 1/2020 | Ghafourifar |
| 2020/0067903 A1 | 2/2020 | Yegorin |
| 2020/0106175 A1 | 4/2020 | Moates |
| 2020/0127610 A1 | 4/2020 | Kusuda |
| 2020/0169969 A1 | 5/2020 | Davlantes |
| 2020/0236043 A1 | 7/2020 | Sze |
| 2020/0252201 A1 | 8/2020 | Sergeev |
| 2020/0365156 A1 | 11/2020 | Allain-Grandvalet |
| 2021/0011797 A1* | 1/2021 | Robison .............. G06F 11/0757 |
| 2021/0014302 A1 | 1/2021 | Robison |

FOREIGN PATENT DOCUMENTS

| | | |
|---|---|---|
| CN | 101501669 A | 8/2009 |
| WO | 2014030756 A1 | 2/2014 |
| WO | 2020018271 A1 | 1/2020 |
| WO | 2020074054 A1 | 4/2020 |

OTHER PUBLICATIONS

Office Action for U.S. Appl. No. 16/570,729, 22 pages, dated Dec. 18, 2020.

Office Action for U.S. Appl. No. 16/593,142, 15 pages, dated Jan. 19, 2021.

Advisory Action from U.S. Appl. No. 16/570,729, dated Feb. 22, 2021, 3 pages.

Final Office Action for U.S. Appl. No. 16/593,142, 16 pages, dated Apr. 6, 2021.

Office Action for U.S. Appl. No. 16/570,729, 15 pages, dated Jul. 16, 2021.

Notice of Allowance for U.S. Appl. No. 16/660,904, dated Jul. 23, 2021, 8 pages.

(56) References Cited

OTHER PUBLICATIONS

Office Action (Notice of Allowance and Fees Due (PTOL-85)) dated Jan. 6, 2023 for U.S. Appl. No. 16/593,142 (pp. 1-11).
Office Action (Notice of Allowance and Fees Due (PTOL-85)) dated Aug. 30, 2021 for U.S. Appl. No. 16/570,729 (pp. 1-8).
Office Action (Notice of Allowance and Fees Due (PTOL-85)) dated Sep. 13, 2021 for U.S. Appl. No. 16/570,729 (pp. 1-3).
Office Action (Final Rejection) dated May 5, 2022 for U.S. Appl. No. 16/593,142 (pp. 1-16).
Office Action (Non-Final Rejection) dated Aug. 8, 2022 for U.S. Appl. No. 16/593,142 (pp. 1-16).
Office Action (Non-Final Rejection) dated Sep. 23, 2021 for U.S. Appl. No. 16/593,142 (pp. 1-19).
Office Action (Non-Final Rejection) dated Nov. 12, 2020 for U.S. Appl. No. 16/660,904 (pp. 1-9).
Office Action (Final Rejection) dated Apr. 12, 2021 for U.S. Appl. No. 16/660,904 (pp. 1-11).
Office Action (Notice of Allowance and Fees Due (PTOL-85)) dated Aug. 11, 2021 for U.S. Appl. No. 16/660,904 (pp. 1-2).
Office Action (Notice of Allowance and Fees Due (PTOL-85)) dated Aug. 25, 2021 for U.S. Appl. No. 16/660,904 (pp. 1-2).
Office Action (Non-Final Rejection) dated Oct. 14, 2022 for U.S. Appl. No. 17/475,758 (pp. 1-19).
Office Action (Notice of Allowance and Fees Due (PTOL-85)) dated Mar. 15, 2023 for U.S. Appl. No. 17/475,758 (pp. 1-8).

\* cited by examiner

CONNECTION POOL ANOMALY DETECTION MECHANISM

CROSS-REFERENCE

This application is a continuation of application Ser. No. 16/660,904, filed Oct. 23, 2019, the entire contents of which are hereby incorporated herein by reference.

TECHNICAL FIELD

One or more implementations relate to monitoring customer relationship management (CRM) systems.

BACKGROUND

Customer Relationship Management (CRM) systems are implemented to manage a company's relationships and interactions with customers and potential customers by compiling data from a range of different communication channels, including a company's website, telephone, email, live chat, marketing materials and social media. Due to the high volume of requests, it is often necessary to monitor CRM systems for adjustments that may be required to modify and balance database connections to ensure optimum CRM system operations.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Methods and systems are provided to facilitate prevent exhaustion of a database connection pool. In embodiments access to the connection pool to various clients is throttled upon a determination that the connection pool is at risk of exhaustion. It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Figure 1:
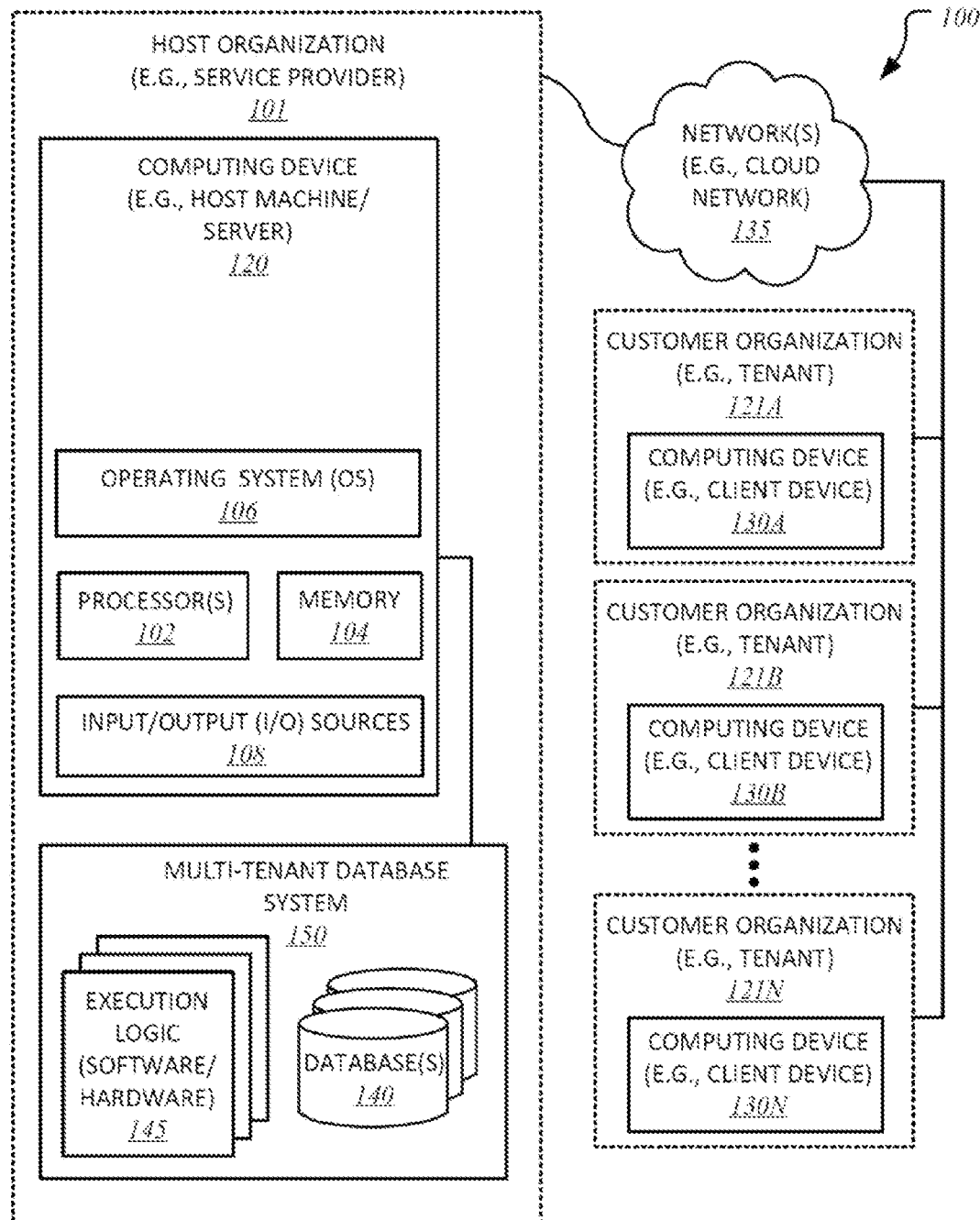
FIG. 1 illustrates one embodiment of a system.

FIG. 1 illustrates one embodiment of a system 100 having a computing device. In one embodiment, computing device 120 includes a host server computer serving a host machine. The term "user" may refer to a system user, such as (without limitation) a software/application developer, a system administrator, a database administrator, an information technology professional, a program manager, product manager, etc. The term "user" may further refer to an end-user, such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

In one embodiment, computing device 120 may serve as a service provider core (e.g., Salesforce.com® core) in communication with one or more database(s) 140, one or more client computers 130A-N, over one or more network(s) 135, and any number and type of dedicated nodes. Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 150 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", "multi-tenant database system" and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
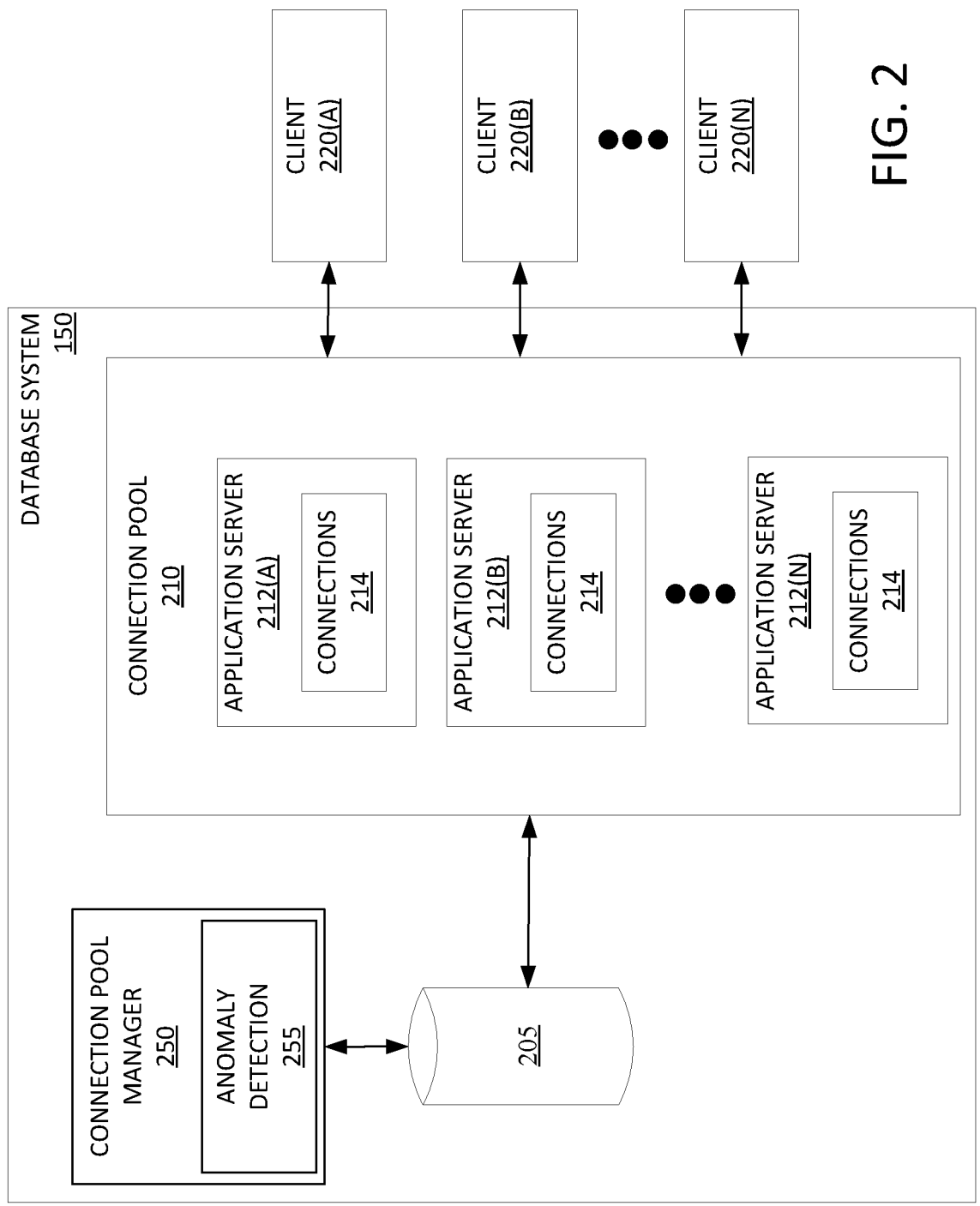
FIG. 2 illustrates one embodiment of a database system.

FIG. 2 illustrates a more detailed embodiment of a database system 150 coupled to clients 220 (e.g., 220(A)-220(N)). As shown in FIG. 2, database system 150 includes database 205, connection pool 210 and connection pool manager 250. According to one embodiment, connection pool 210 is implemented to enhance performance of executing commands on database 205, and provides a cache of database connections that are maintained to be reused for future database requests. In embodiments, a connection that is created is placed in connection pool 210 and is used again to prevent a new connection from having to be established. In further embodiments a new connection may be created and added to connection pool 210 if all current connections are being used.

According to one embodiment, connection pool 210 includes one or more application servers 212 (e.g., 212(A)-212(N)), each managing a plurality of connections 214. In such an embodiment, application servers 212 manage access by clients to database 205 resources via the connections 214. Thus, connections operate as traffic lanes to database 205. In a further embodiment, the database system 150 resources may be configured as one or more Point of Developments (PODs) (or instance machine). In this embodiment, an instance machine (or instance) comprises a cluster of infrastructure (e.g., servers, software, networking equipment, etc.) that operate collectively to serve client 220 traffic. Accordingly, two or more of servers 212 may be combined to operate as a cluster of servers, resulting in the pooling of connections 214 within the cluster.

However, while client 220 traffic, load and consumed resources may be dynamic (e.g., variable over time), the database system 150 resources are relatively static. Thus the maximum number of connections implemented in conventional systems are fixed, which may restrict the magnitude of traffic to the database. Connection pool manager 250 manages the configuration of connection pool 210. In one embodiment, connection pool manager 250 automatically adjusts the connections 214 in connection pool 210, or a cluster of application server 212 connections. Accordingly, connection pool manager 250 configures connection pool 210 for automatic adjustment to match traffic conditions.

However conventional connection pool management mechanisms have not been able to effectively manage all pool traffic conditions. For instance, a condition referred to as connection pool exhaustion may occur when there are no available connections in pool 210. Although connection pool exhaustion incidents may occur frequently, there are currently no mechanisms to prevent such incidents. Moreover, there is no automatic process to determine which clients are actually using the connection pool, or track how much each client is utilizing the connection pool, in order to detect overuse of the connection pool by clients that may causing the incidents.

According to one embodiment, connection pool manager 250 includes an anomaly detection mechanism 255 that monitors connection pool 210 to detect whether conditions exist that could lead to connection pool exhaustion. In such an embodiment, anomaly detection mechanism 255 determines whether a client request will cause connection pool exhaustion on a connection pool cluster. In a further embodiment, anomaly detection mechanism 255 may throttle client access requests by withholding a portion of available connections upon determining that the request swill cause connection pool exhaustion.

Figure 3:
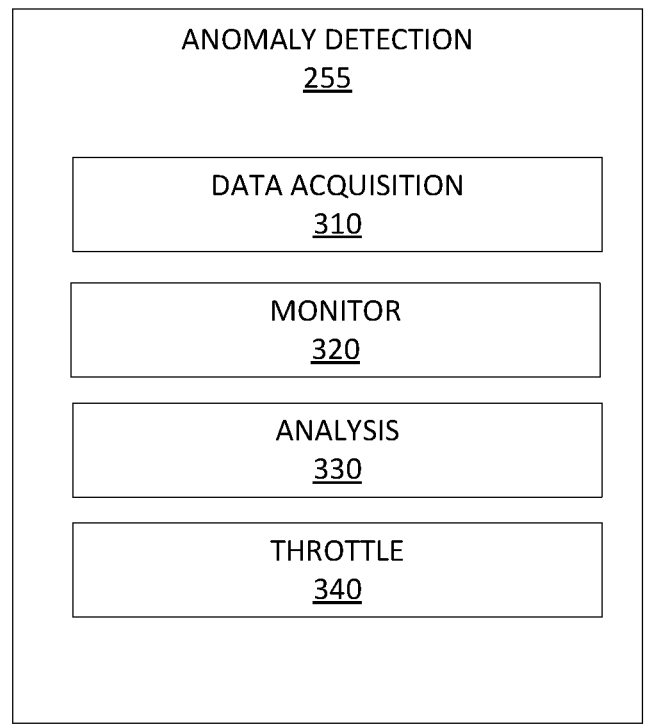
FIG. 3 illustrates one embodiment of an anomaly detection mechanism.

FIG. 3 illustrates one embodiment of anomaly detection mechanism 255. As shown in FIG. 3, anomaly detection mechanism 255 includes data acquisition logic 310, monitor 320, analysis engine 330 and throttle engine 340. Data acquisition logic 310 accesses application servers 212 to retrieve and store connection pool 210 source data. According to one embodiment, the source data includes current data indicating current connection pool 210 conditions. Additionally, the source data includes historical data of past connection pool 210 conditions. In yet a further embodiment, the current and historical source data includes connection pool access data for each client that has accessed connection pool 210. In such an embodiment, the client data may be used indicate excessive use by one or more clients that could, or has previously, resulted in the connection pool exhaustion occurrences.

Monitor 320 monitors the current data to determine whether one or more connection pool clusters are at risk of connection pool exhaustion condition (e.g., connection pool is in trouble). According to one embodiment, monitor 320 may indicate that a connection pool 210 is in trouble upon a determination that pool utilization is greater than a configured threshold utilization value (e.g., pool utilization>X) and a number of clients waiting to obtain a connection is greater than a configured threshold of clients (e.g., clients waiting>Y).

In a further embodiment, connection pool exhaustion may be categorized as "sustained" or "intermittent". A connection pool 210 is considered to be in sustained trouble upon a determination that the pool has been in trouble more than a first configured threshold percentage of intervals (e.g., pool in trouble>A times in past M intervals). Further, a connection pool 210 is considered to be in intermittent trouble upon a determination that the pool has been in trouble more than a second predetermined threshold percentage of intervals that is less than the first configured threshold percentage of intervals (e.g., pool in trouble>B times in past N intervals, where B<A and N>M). In a further embodiment, monitor 320 may trigger an alert to a GUI upon detecting that a connection pool 210 is in trouble, or in a state of exhaustion.

Analysis engine 330, upon a determination that the connection pool is in trouble, examines the historical data to determine usage by clients that has led to, or may lead to connection pool 210 becoming at risk of, connection pool exhaustion (e.g., candidate clients that may be causing a risk of connection exhaustion (or offenders)). According to one embodiment, analysis engine 330 evaluates all incoming client request source data to connection pool 210. In such an embodiment, analysis engine 330 evaluates the received access requests to determine whether a client is to be categorized as an offender. In a further embodiment, the access request includes data indicating a client organization (or org) from which the request has been received, a Uniform Resource Identifier (URI), timestamp and application servers to which the request was made. Based on these identifiers, analysis engine 330 may determine total utilization by each client to determine whether one or more clients are to be categorized as an offender.

In one embodiment, client's that are offenders may be categorized as "sustained" or "intermittent" offenders. In such an embodiment, a candidate client is designated as a sustained offender upon a determination that the client utilization is greater than a configured threshold percentage of intervals (e.g., client usage>P % in the last M intervals). A candidate client is designated as an intermittent offender upon a determination that a client weight is greater than a configured threshold (e.g., client weight>Q, where the weight is based on the timestamp, utilization, and properties from the candidate).

In one embodiment, the threshold parameters X, Y, A, B, M, N, P, Q are configured based on an examination of the historical data. In such an embodiment, analysis engine 330 learns from previous exhaustion incidents and dynamically configures anomaly detection mechanism 255 in response to environment changes. In a further embodiment, client offenders may be converted between "sustained" and "intermittent".

Throttle engine 340 throttles access to clients identified as an offender. According to one embodiment, throttle engine 340 throttles access based on one or more throttle rules. In such an embodiment, the throttle rules provides a throttle access rate limit (e.g., requests per second) for an offending client, as well as an expiration date for throttling conditions.

In a further embodiment, the throttling rules may expire or be extended based on the connection pool conditions indicated by the continued update of the source data. Accordingly an offending client's throttling rate may be dynamically adjusted, or completely restored, based on the connection pool status and/or the offenders severity. In a further embodiment the throttling rules may be controlled at a server 212 cluster level. However in other embodiments, the throttling rules may be controlled at a server 212 level.

In such embodiments, exceptions may be made for some offender clients to prevent the throttling of the access rate.

Figure 4:
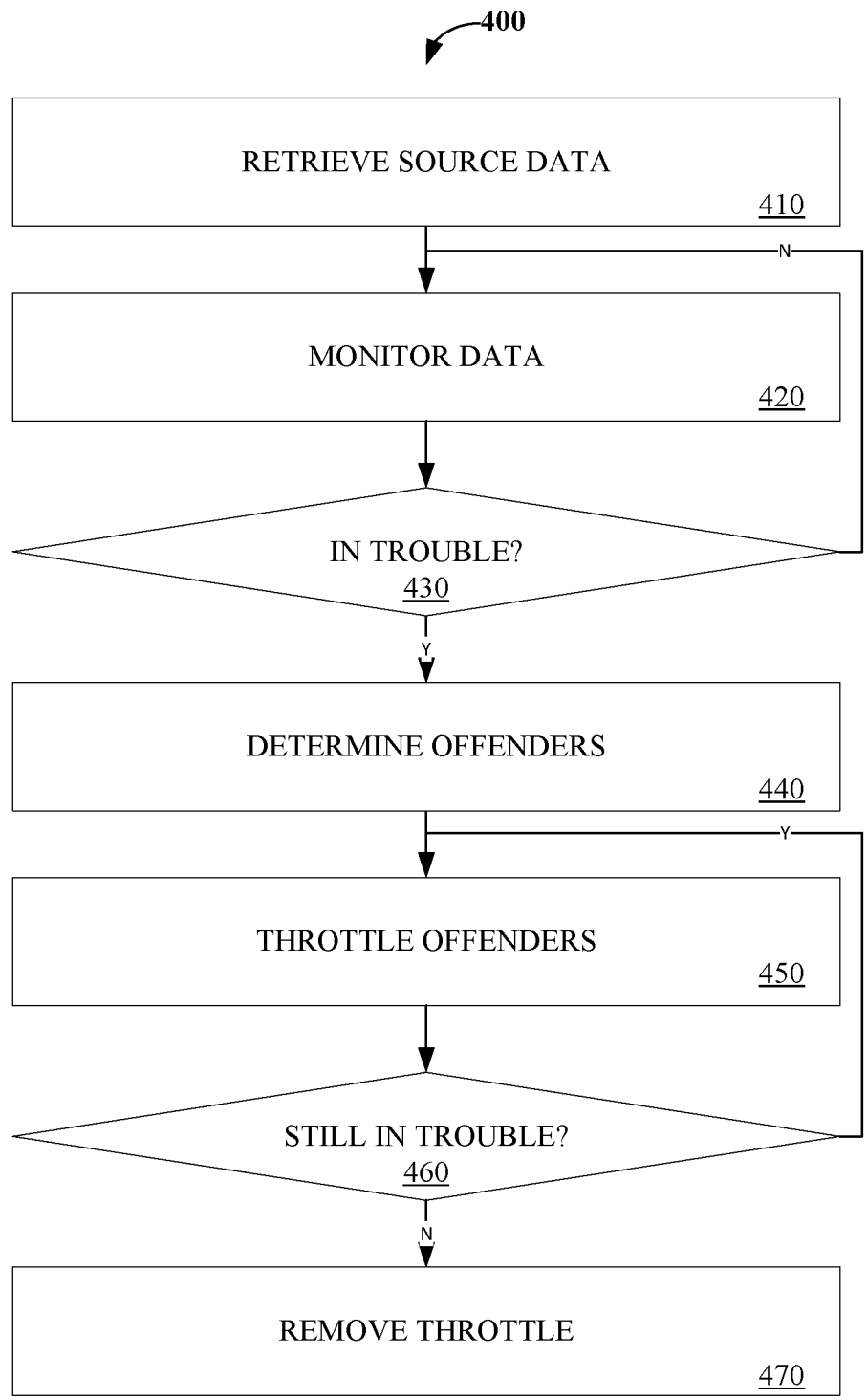
FIG. 4 is a flow diagram illustrating one embodiment of a process for managing a connection pool.

FIG. 4 is a flow diagram of a method 400 illustrating one embodiment of a process to manage connection pool conditions via anomaly detection. Method 400 may be performed by processing logic that may comprise hardware (e.g., circuitry, dedicated logic, programmable logic, etc.), software (such as instructions run on a processing device), or a combination thereof. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3 may not be repeated or discussed hereafter.

Method 400 begins at processing block 410, source data is retrieved for a connection pool (e.g., connection pool cluster) and stored. At processing block 420, the data is monitored to detect connection pool traffic conditions. At decision block 430, a determination is made as to whether the connection pool is in trouble. If not, control is returned to processing block 420, where the data continues to be monitored.

However upon a determination at decision block 430 that the connection pool is in trouble, client access requests included in the data are analyzed to determine whether there are one or more offenders causing the connection pool to be in trouble, processing block 440. At processing block 450, the access rate limit of the offending clients is throttled based on whether a client is a sustained or intermittent offender.

At decision block 460, a determination is made as to whether the connection pool is still in trouble. If so, control is returned to processing block 450, where the offenders' access rate limit remains throttled. As discussed above, the throttled rate may be continuously adjusted based on a real-time receipt of connection pool data. Upon a determination at decision block 460 the connection pool is no longer in trouble, the throttle of the offender's access rate is removed, processing block 470.

The above-described anomaly detection mechanism enables providing comprehensive connection pool details to track, investigate and perform diagnosis, balance resources across clients using connections and identify potential connection pool incidents, as well as those that are happening. Additionally, the anomaly detection mechanism identifies connection holders commonly from a uniform resource indicator (URI) associated with and endpoint (or tenant), resolves and prevents connection pool exhaustion by automatically throttling requests, and provides data for connection pool health visualization and comparison. Further, the anomaly detection mechanism reduces the number of the manual interventions from to resolve connection pool exhaustion.

Figure 5:
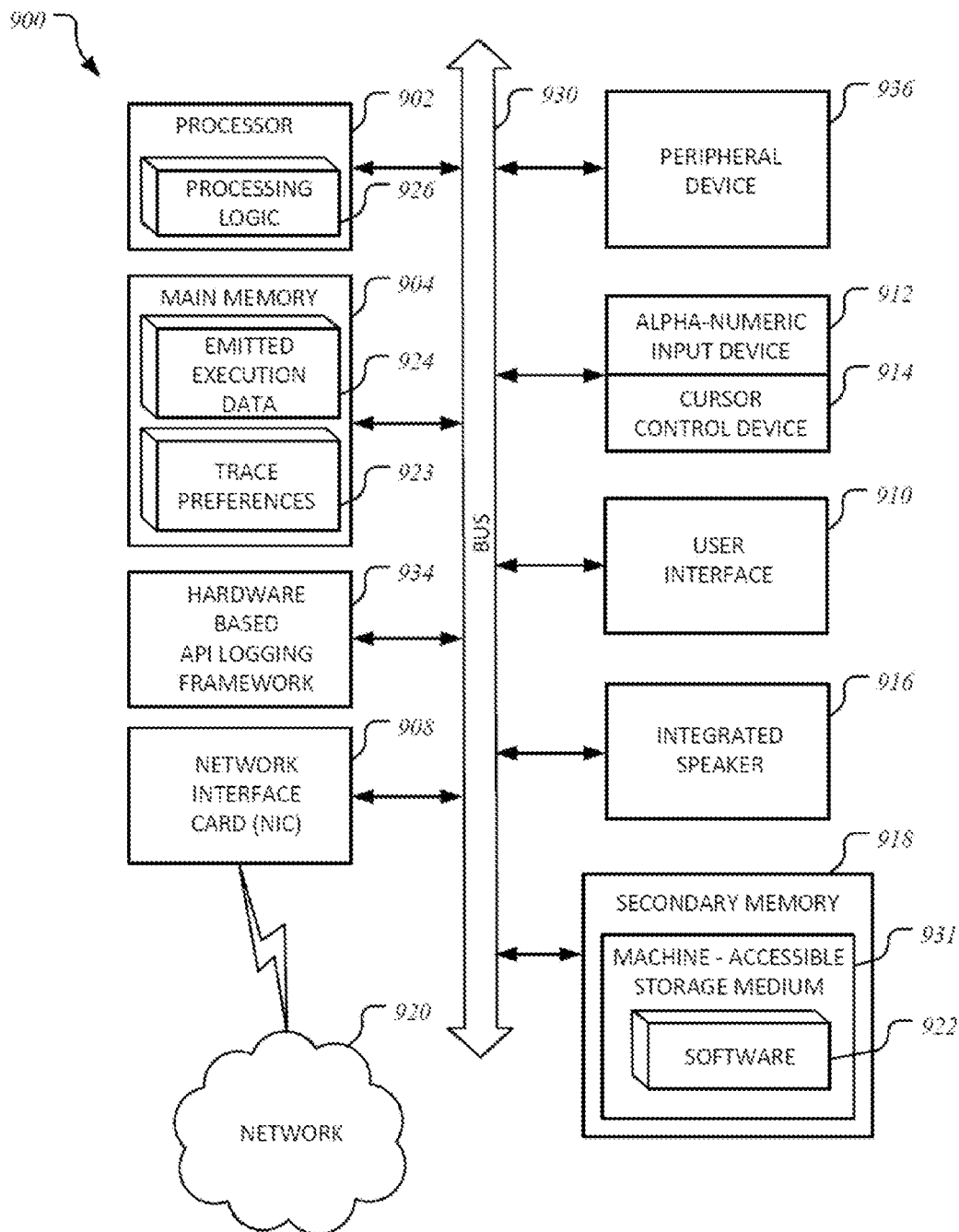
FIG. 5 illustrates a computer system according to one embodiment.

FIG. 5 illustrates a diagrammatic representation of a machine 900 in the exemplary form of a computer system, in accordance with one embodiment, within which a set of instructions, for causing the machine 900 to perform any one or more of the methodologies discussed herein, may be executed. Machine 900 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 918 (e.g., a persistent storage device including hard disk drives and persistent multi-tenant data base implementations), which communicate with each other via a bus 930. Main memory 904 includes emitted execution data 924 (e.g., data emitted by a logging framework) and one or more trace preferences 923 which operate in conjunction with processing logic 926 and processor 902 to perform the methodologies discussed herein.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations as described with reference to FIG. 1 and other Figures discussed herein.

The computer system 900 may further include a network interface card 908. The computer system 900 also may include a user interface 910 (such as a video display unit, a liquid crystal display (LCD), or a cathode ray tube (CRT)), an alphanumeric input device 912 (e.g., a keyboard), a cursor control device 914 (e.g., a mouse), and a signal generation device 916 (e.g., an integrated speaker). The computer system 900 may further include peripheral device 936 (e.g., wireless or wired communication devices, memory devices, storage devices, audio processing devices, video processing devices, etc. The computer system 900 may further include a Hardware based API logging framework 934 capable of executing incoming requests for services and emitting execution data responsive to the fulfillment of such incoming requests.

The secondary memory 918 may include a machine-readable storage medium (or more specifically a machine-accessible storage medium) 931 on which is stored one or more sets of instructions (e.g., software 922) embodying any one or more of the methodologies as described with reference to FIG. 1, respectively, and other figures discussed herein. The software 922 may also reside, completely or at least partially, within the main memory 904 and/or within the processor 902 during execution thereof by the computer system 900, the main memory 904 and the processor 902 also constituting machine-readable storage media. The software 922 may further be transmitted or received over a network 920 via the network interface card 908. The machine-readable storage medium 931 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
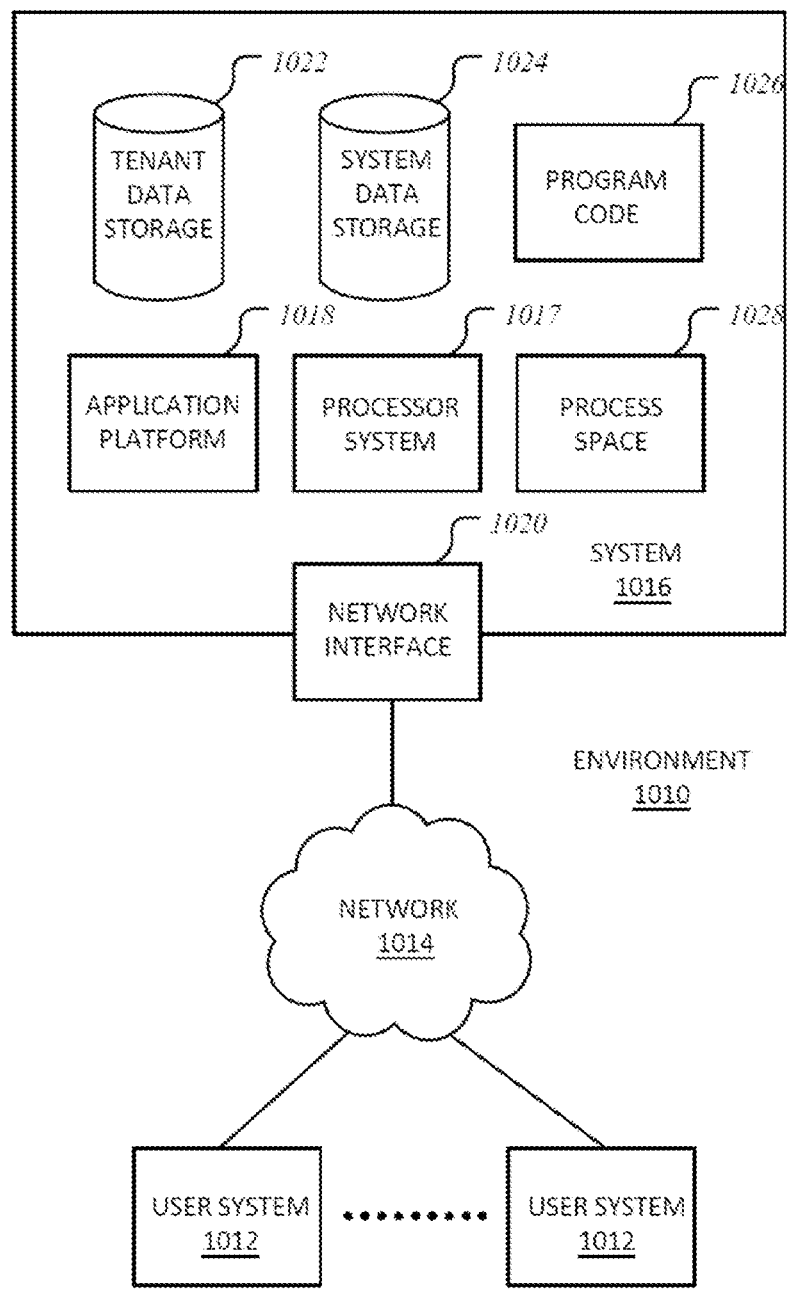
FIG. 6 illustrates an environment wherein an on-demand database service might be used according to one embodiment.

FIG. 6 illustrates a block diagram of an environment 1010 wherein an on-demand database service might be used. Environment 1010 may include user systems 1012, network 1014, system 1016, processor system 1017, application platform 618, network interface 1020, tenant data storage 1022, system data storage 1024, program code 1026, and process space 1028. In other embodiments, environment 1010 may not have all of the components listed and/or may have other elements instead of, or in addition to, those listed above.

Environment 1010 is an environment in which an on-demand database service exists. User system 1012 may be any machine or system that is used by a user to access a database user system. For example, any of user systems 1012 can be a handheld computing device, a mobile phone, a laptop computer, a workstation, and/or a network of computing devices. As illustrated in herein FIG. 6 (and in more detail in FIG. 7) user systems 1012 might interact via a network 1014 with an on-demand database service, which is system 1016.

An on-demand database service, such as system 1016, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1016" and "system 1016" will be used interchangeably herein. A database image may include one or more database objects. A relational database management system (RDMS) or the equivalent may execute storage and retrieval of information against the database object(s). Application platform 1018 may be a framework that allows the applications of system 1016 to run, such as the hardware and/or software, e.g., the operating system. In an embodiment, on-demand database service 1016 may include an application platform 1018 that enables creation, managing and executing one or more applications developed by the provider of the on-demand database service, users accessing the on-demand database service via user systems 1012, or third party application developers accessing the on-demand database service via user systems 1012.

The users of user systems 1012 may differ in their respective capacities, and the capacity of a particular user system 1012 might be entirely determined by permissions (permission levels) for the current user. For example, where a salesperson is using a particular user system 1012 to interact with system 1016, that user system has the capacities allotted to that salesperson. However, while an administrator is using that user system to interact with system 1016, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1014 is any network or combination of networks of devices that communicate with one another. For example, network 1014 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 1012 might communicate with system 1016 using TCP/IP and, at a higher network level, use other common Internet protocols to communicate, such as HTTP, FTP, AFS, WAP, etc. In an example where HTTP is used, user system 1012 might include an HTTP client commonly referred to as a "browser" for sending and receiving HTTP messages to and from an HTTP server at system 1016. Such an HTTP server might be implemented as the sole network interface between system 1016 and network 1014, but other techniques might be used as well or instead. In some implementations, the interface between system 1016 and network 1014 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1016, shown in FIG. 6, implements a web-based customer relationship management (CRM) system. For example, in one embodiment, system 1016 includes application servers configured to implement and execute CRM software applications as well as provide related data, code, forms, webpages and other information to and from user systems 1012 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1016 implements applications other than, or in addition to, a CRM application. For example, system 1016 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 1016.

One arrangement for elements of system 1016 is shown in FIG. 6, including a network interface 1020, application platform 1018, tenant data storage 1022 for tenant data 1023, system data storage 1024 for system data 1025 accessible to system 1016 and possibly multiple tenants, program code 1026 for implementing various functions of system 1016, and a process space 1028 for executing MTS system processes and tenant-specific processes, such as running applications as part of an application hosting service. Additional processes that may execute on system 1016 include database-indexing processes.

Several elements in the system shown in FIG. 6 include conventional, well-known elements that are explained only briefly here. For example, each user system 1012 could include a desktop personal computer, workstation, laptop, PDA, cell phone, or any wireless access protocol (WAP) enabled device or any other computing device capable of interfacing directly or indirectly to the Internet or other network connection. User system 1012 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1012 to access, process and view information, pages and applications available to it from system 1016 over network 1014. User system 1012 further includes Mobile OS (e.g., iOS® by Apple®, Android®, WebOS® by Palm®, etc.). Each user system 1012 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1016 or other systems or servers. For example, the user interface device can be used to access data and applications hosted by system 1016, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1012 and all of its components are operator configurable using applications, such as a browser, including computer code run using a central processing unit such as an Intel Core® processor or the like. Similarly, system 1016 (and additional instances of an MTS, where more than one is present) and all of their components might be operator configurable using application(s) including computer code to run using a central processing unit such as processor system 1017, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1016 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1016 is configured to provide webpages, forms, applications, data and media content to user (client) systems 1012 to support the access by user systems 1012 as tenants of system 1016. As such, system 1016 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
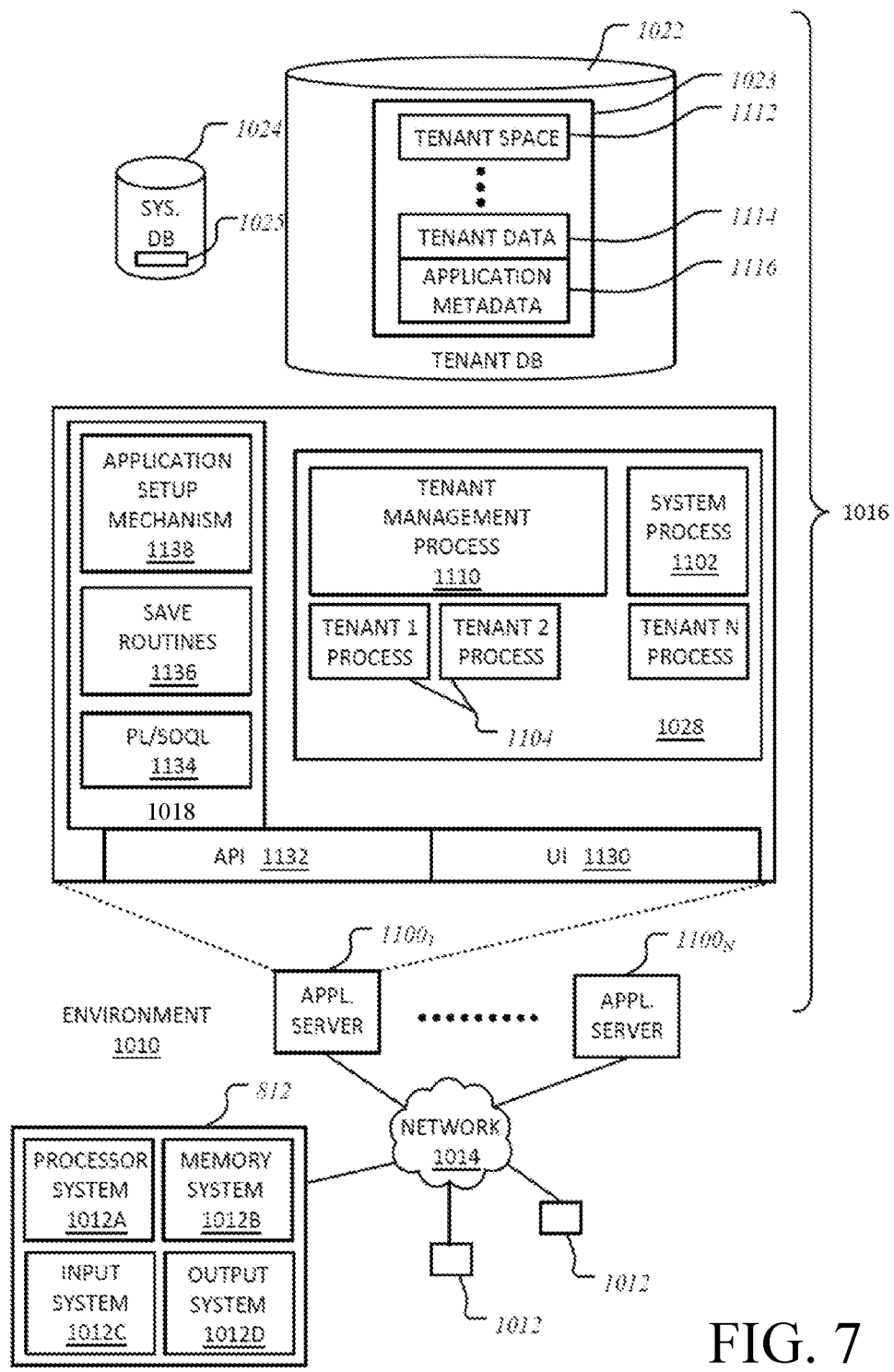
FIG. 7 illustrates elements of environment of FIG. 6 and various possible interconnections between these elements according to one embodiment.

FIG. 7 also illustrates environment 1010. However, in FIG. 7 elements of system 1016 and various interconnections in an embodiment are further illustrated. FIG. 7 shows that user system 1012 may include processor system 1012A, memory system 1012B, input system 1012C, and output system 1012D. FIG. 7 shows network 1014 and system 1016. FIG. 7 also shows that system 1016 may include tenant data storage 1022, tenant data 1023, system data storage 1024, system data 1025, User Interface (UI) 1130, Application Program Interface (API) 1132, PL/SOQL 1134, save routines 1136, application setup mechanism 1138, applications servers $1100_1$-$1100_N$, system process space 1102, tenant process spaces 1104, tenant management process space 1110, tenant storage area 1112, user storage 1114, and application metadata 1116. In other embodiments, environment 1010 may not have the same elements as those listed above and/or may have other elements instead of, or in addition to, those listed above.

User system 1012, network 1014, system 1016, tenant data storage 1022, and system data storage 1024 were discussed above in FIG. 6. Regarding user system 1012, processor system 1012A may be any combination of one or more processors. Memory system 1012B may be any combination of one or more memory devices, short term, and/or long term memory. Input system 1012C may be any combination of input devices, such as one or more keyboards, mice, trackballs, scanners, cameras, and/or interfaces to networks. Output system 1012D may be any combination of output devices, such as one or more monitors, printers, and/or interfaces to networks. As shown by FIG. 7, system 1016 may include a network interface 1020 (of FIG. 6) implemented as a set of HTTP application servers 1100, an application platform 1018, tenant data storage 1022, and system data storage 1024. Also shown is system process space 1102, including individual tenant process spaces 1104 and a tenant management process space 1110. Each application server 1100 may be configured to tenant data storage 1022 and the tenant data 1023 therein, and system data storage 1024 and the system data 1025 therein to serve requests of user systems 1012. The tenant data 1023 might be divided into individual tenant storage areas 1112, which can be either a physical arrangement and/or a logical arrangement of data. Within each tenant storage area 1112, user storage 1114 and application metadata 1116 might be similarly allocated for each user. For example, a copy of a user's most recently used (MRU) items might be stored to user storage 1114. Similarly, a copy of MRU items for an entire organization that is a tenant might be stored to tenant storage area 1112. A UI 1130 provides a user interface and an API 71132 provides an application programmer interface to system 1016 resident processes to users and/or developers at user systems 1012. The tenant data and the system data may be stored in various databases, such as one or more Oracle™ databases.

Application platform 1018 includes an application setup mechanism 1138 that supports application developers' creation and management of applications, which may be saved as metadata into tenant data storage 1022 by save routines 1136 for execution by subscribers as one or more tenant process spaces 1104 managed by tenant management process 1110 for example. Invocations to such applications may be coded using PL/SOQL 1134 that provides a programming language style interface extension to API 1132. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1116 for the subscriber making the invocation and executing the metadata as an application in a virtual machine.

Each application server 1100 may be communicably coupled to database systems, e.g., having access to system data 1025 and tenant data 1023, via a different network connection. For example, one application server $1100_1$ might be coupled via the network 1014 (e.g., the Internet), another application server $1100_{N-1}$ might be coupled via a direct network link, and another application server $1100_N$ might be coupled by yet a different network connection. Transfer Control Protocol and Internet Protocol (TCP/IP) are typical protocols for communicating between application servers 1100 and the database system. However, it will be apparent to one skilled in the art that other transport protocols may be used to optimize the system depending on the network interconnect used.

In certain embodiments, each application server 1100 is configured to handle requests for any user associated with any organization that is a tenant. Because it is desirable to be able to add and remove application servers from the server pool at any time for any reason, there is preferably no server affinity for a user and/or organization to a specific application server 1100. In one embodiment, therefore, an interface system implementing a load balancing function (e.g., an F5 Big-IP load balancer) is communicably coupled between the application servers 1100 and the user systems 1012 to distribute requests to the application servers 1100. In one embodiment, the load balancer uses a least connections algorithm to route user requests to the application servers 1100. Other examples of load balancing algorithms, such as round robin and observed response time, also can be used. For example, in certain embodiments, three consecutive requests from the same user could hit three different application servers 1100, and three requests from different users could hit the same application server 1100. In this manner, system 1016 is multi-tenant, wherein system 1016 handles storage of, and access to, different objects, data and applications across disparate users and organizations.

As an example of storage, one tenant might be a company that employs a sales force where each salesperson uses system 1016 to manage their sales process. Thus, a user might maintain contact data, leads data, customer follow-up data, performance data, goals and progress data, etc., all applicable to that user's personal sales process (e.g., in tenant data storage 1022). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1016 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1016 might also maintain system level data usable by multiple tenants or other data. Such system level data might include industry reports, news, postings, and the like that are sharable among tenants.

In certain embodiments, user systems 1012 (which may be client systems) communicate with application servers 1100 to request and update system-level and tenant-level data from system 1016 that may require sending one or more queries to tenant data storage 1022 and/or system data storage 1024. System 1016 (e.g., an application server 1100 in system 1016) automatically generates one or more SQL statements (e.g., one or more SQL queries) that are designed to access the desired information. System data storage 1024 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method to prevent exhaustion of a database connection pool, comprising:

retrieving data from the database connection pool;

analyzing the data to determine whether the database connection pool is at risk, wherein the database connection pool is determined to be at risk upon a determination that utilization of the database connection pool has been at risk in a number of intervals in the multiple intervals in which the data connection pool is analyzed for being at risk; and throttling access to the database connection pool upon determining the database connection pool has been at risk, wherein:

the database connection pool is determined to be at sustained risk upon a determination that the database connection pool has been at risk for more than a first threshold percentage of the intervals, the database connection pool is determined to be at intermittent risk upon a determination that the database connection pool has been at risk for more than a second predetermined threshold percentage of the intervals, wherein the second predetermined threshold percentage is less than the first threshold percentage of the intervals, and a client is determined as a sustained offender upon a determination that the client is an offender having a utilization greater than a third predetermined threshold percentage of the intervals.

2. The method of claim 1, further comprising determining that a client is an intermittent offender upon a determination that the client is an offender having a client weight greater than a predetermined threshold weight.

3. The method of claim 1, wherein access is throttled to one or more clients that are accessing the database connection pool based on one or more throttling rules providing throttling conditions including a throttle access rate limit.

4. The method of claim 3, wherein the access the one or more throttling rules further comprise an expiration date for the throttling conditions.

5. The method of claim 3, further comprising removing the throttle upon a determination that the connection pool is no longer at risk.

6. The method of claim 1, wherein the database connection pool is determined to be at risk of a first category upon a determination that utilization of the database connection pool has been at risk based on a first threshold of the intervals, and at risk of a second category upon a determination that utilization of the database connection pool has been at risk based on a second threshold of the intervals.

7. A computing device comprising:
at least one physical memory device to store a connection pool manager; and
one or more processors coupled with the at least one physical memory device, the one or more processors configurable to execute the connection pool manager to:
retrieving data from a database connection pool;
analyzing the data to determine whether utilization of the database connection pool is at risk, wherein the database connection pool is determined to be at risk upon a determination that utilization of the database connection pool has been at risk in a number of intervals in which the data connection pool is analyzed for being at risk; and
throttling access to the database connection pool upon determining the database connection pool has been at risk, wherein:
the database connection pool is determined to be at sustained risk upon a determination that the database connection pool has been at risk for more than a first threshold percentage of the intervals,
the database connection pool is determined to be at intermittent risk upon a determination that the database connection pool has been at risk for more than a second predetermined threshold percentage of the intervals, wherein the second predetermined threshold percentage is less than the first threshold percentage of the intervals, and
a client is determined as a sustained offender upon a determination that the client is an offender having a utilization greater than a third predetermined threshold percentage of the intervals.

8. The computing device of claim 7, wherein the connection pool manager determines that a client is an intermittent offender upon a determination that the client is an offender having a client weight greater than a predetermined threshold weight.

9. The computing device of claim 7, wherein the access is throttled to one or more clients that are accessing the database connection pool based on one or more throttling rules providing a throttle access rate limit.

10. The computing device of claim 9, wherein the connection pool manager removes the throttle upon a determination that the connection pool is no longer at risk.

11. The computing device of claim 9, wherein the database connection pool is determined to be at risk of a first category upon a determination that utilization of the database connection pool has been at risk based on a first threshold of the intervals, and at risk of a second category upon a determination that utilization of the database connection pool has been at risk based on a second threshold of the intervals.

12. A non-transitory computer-readable medium having stored thereon instructions that, when executed by one or more processors, are configurable to cause the one or more processors to:
retrieving data from a database connection pool;
analyzing the data to determine whether the database connection pool is at risk, wherein the database connection pool is determined to be at risk upon a determination that utilization of the database connection pool has been at risk in a number of intervals in which the data connection pool is analyzed for being at risk; and
throttling access to the database connection pool upon determining the database connection pool has been at risk, wherein:
the database connection pool is determined to be at sustained risk upon a determination that the database connection pool has been at risk for more than a first threshold percentage of the intervals,
the database connection pool is determined to be at intermittent risk upon a determination that the database connection pool has been at risk for more than a second predetermined threshold percentage of the intervals, wherein the second predetermined threshold percentage is less than the first threshold percentage of the intervals, and
a client is determined as a sustained offender upon a determination that the client is an offender having a utilization greater than a third predetermined threshold percentage of the intervals.

13. The non-transitory computer-readable medium of claim 12, wherein the access is throttled to one or more clients that are accessing the database connection pool based on one or more throttling rules providing a throttle access rate limit.

14. The non-transitory computer-readable medium of claim 13, having stored thereon instructions that, when executed by one or more processors, further cause the processors to remove the throttle upon a determination that the connection pool is no longer at risk.

15. The non-transitory computer-readable medium of claim 12, wherein the database connection pool is determined to be at risk of a first category upon a determination that utilization of the database connection pool has been at risk based on a first threshold of the intervals, and at risk of a second category upon a determination that utilization of the database connection pool has been at risk based on a second threshold of the intervals.

16. The non-transitory computer-readable medium of claim 12, wherein the connection pool manager determines that a client is an intermittent offender upon a determination that the client is an offender having a client weight greater than a predetermined threshold weight.

* * * * *

UNITED STATES PATENT AND TRADEMARK OFFICE
CERTIFICATE OF CORRECTION

| | | |
|---|---|---|
| PATENT NO. | : 11,750,692 B2 | Page 1 of 1 |
| APPLICATION NO. | : 17/475825 | |
| DATED | : September 5, 2023 | |
| INVENTOR(S) | : Olumayokun Obembe et al. | |

It is certified that error appears in the above-identified patent and that said Letters Patent is hereby corrected as shown below:

In the Claims

In Claim 1, Column 16, Lines 49-50, please delete "in the multiple intervals"

In Claim 7, Column 17, Line 32, please delete "utilization of"

Signed and Sealed this
Thirtieth Day of July, 2024

Katherine Kelly Vidal
*Director of the United States Patent and Trademark Office*